United States Patent [19]
van Brederode et al.

[11] 3,993,713
[45] Nov. 23, 1976

[54] PROCESS FOR PREPARING FINELY DIVIDED POLYMERS

[75] Inventors: Robert A. van Brederode; Joseph C. Floyd, both of Baytown, Tex.

[73] Assignee: Exxon Research and Engineering Company, Linden, N.J.

[22] Filed: Aug. 6, 1975

[21] Appl. No.: 602,212

[52] U.S. Cl. .............................. 260/878 R; 264/8; 264/12; 264/13; 528/498; 528/501
[51] Int. Cl.² ........................................... C08F 6/12
[58] Field of Search....... 260/93.7, 94.9 F, 94.9 GC, 260/94.9 GD, 878 R; 264/8, 12–13; 528/501, 498

[56] References Cited
UNITED STATES PATENTS

| | | | |
|---|---|---|---|
| 3,119,801 | 1/1964 | Haskell | 260/94.9 GD |
| 3,244,687 | 4/1966 | Spindler | 260/94.9 GD |
| 3,306,342 | 2/1967 | DiSalvo et al. | 264/12 |
| 3,563,975 | 2/1971 | Zavasnik | 260/94.9 F |
| 3,743,272 | 7/1973 | Nowotny et al. | 260/94.9 GD |
| 3,849,516 | 11/1974 | Plank | 260/878 R |
| 3,862,265 | 1/1975 | Steinkamp et al. | 260/878 R |
| 3,882,095 | 5/1975 | Fowells et al. | 260/94.9 F |
| 3,891,499 | 6/1975 | Kato et al. | 264/13 |
| 3,896,196 | 7/1975 | Dickey et al. | 264/13 |

*Primary Examiner*—Alan Holler
*Attorney, Agent, or Firm*—David A. Roth

[57] ABSTRACT

Finely powdered high density polymer may be obtained by spraying a solution of a critical maximum amount of a polymer, such as 3 weight % polypropylene in heptane, into a drying atmosphere in which said solvent has a vapor pressure of 50 to 400 mm of Hg.

16 Claims, No Drawings

PROCESS FOR PREPARING FINELY DIVIDED POLYMERS

BACKGROUND OF THE INVENTION

This invention relates to the preparation of finely divided normally solid, synthetic organic polymeric thermoplastic resins.

Thermoplastic polymers in powder or finely divided form have a wide variety of commercial applications, such as for example, the dry powders have been used to coat articles in dry form by dip coating in either static or fluidized beds, by electrostatic coating, spraying, or dusting and flame spraying. The powders are used in dispersed form in suitable liquid carriers to apply coatings by roller coating, spray coating, and dip coating to a variety of substrates such as, glass, ceramics, metal, wood, cloth, paper, paperboard, and the like. The finely divided polymers have also been successfully employed in conventional powder molding techniques. The fine powders have also been applied as paper pulp additives, mold release agents, wax polish, paint compositions, binders for non woven fabrics and finishes for woven fabrics.

There are basically four types of processes employed in the prior art for preparing finely divided polymer particles, i.e., mechanical grinding, solvent precipitated, dispersion and spray atomization of solutions or slurries.

Generally mechanical grinding employs conventional equipment to yield particles of irregular shape and wide size variation of from about 75 to 300 microns. The powders produced by this method may not be suitable for applications where free flowing powders are required, since the irregular shapes may inhibit the flowability of these powders. The grinding of some polymer may be very costly because of the toughness of the resin even when cryogenically cooled.

The precipitation technique generally entails dissolving the polymer in a solvent, followed by precipitation of the polymer in finely divided form through addition of a nonsolvent, evaporation of the solvent or a combination of the two. Problems in this process have included difficulty in manipulating the solvents, solvent removal, particle agglomeration which require a great deal of grinding and particles having irregular somewhat rounded shapes.

The dispersion method also is subject to high shear conditions. Frequently water is the dispersing medium and dispersing agents are used to facilitate the dispersion. Hence the powders produced by this technique generally incorporate some or all of the dispersing agent in the powder which can create undesirable changes in the original polymer properties, e.g., increased water sensitivity, loss of electrical insulating values, loss of adhesive capabilities, etc.

The final type of prior art process is the spray technique which is generally satisfactory for producing uniform non agglomerated spherical particles, however, very specialized equipment, usually nozzles operating under a limited range of conditions to prevent nozzle plugging are required. A substantial problem in spraying is the shearing of the polymer solution as it passes through the nozzle, premature precipitation of the polymer or too rapid volatilization of solvent.

Spray drying solutions of polymers is a difficult procedure. Large irregular particles or only fibers frequently result from sprayed polymer solutions. Not infrequently powder products from spraying are spheres with fine tails. Attempts to overcome these problems, generally have involved, random modification of process variables, changes of solvent and exotic spraying and atomizing equipment.

SUMMARY OF THE INVENTION

Briefly stated the present invention is a process for producing fine high density powders from solutions of polymers in organic solvents by atomizing said solution into a drying atmosphere or zone, vaporizing said solvent and recovering powdered polymer, wherein the improvement comprises employing solvents containing an amount of polymer dissolved therein whereby the formation of droplets of polymer is not inhibited at the temperature of said drying atmosphere, said solvent having a vapor pressure of 50 to 400 millimeters of mercury, preferably about 100 to about 300 millimeters of mercury at the temperature of said drying atmosphere. Under these conditions a spherical polymer powder finer than 100 microns is produced. It has been found that the critical maximum amount of polypropylene which may be present in a n-heptane solvent is 3 weight percent, preferably about 1 to 3 weight percent.

Polymer concentrations above that which allow the droplet formation result in strings or powder particles with hair like tails. The maximum polymer concentration for any particular system of polymer-solvent may easily be determined. It is essential the viscosity of the polymer-solvent solution should be no greater than 5 centipoise at the temperature of atomization. It is believed that excessive viscosity of the solution does not permit the surface tension forces to form spherical droplets of polymer dissolved in solvent. Instead, strings of polymer occur.

DETAILED DESCRIPTION OF THE INVENTION

The drying atmosphere is a complex system comrising the ambient atmosphere of the drying chamber, the atomized solvent and the atomizing or blowing gas and the drying gas, if any. The nature of the drying atmosphere, as the present invention is preferably practiced, is substantially affected by the fluidized streams, i.e., the atomized solvent (possibly an atomizing gas is associated with the solvent) and the drying gas. Hence, the temperature of these various streams create a system within the drying atmosphere, which although stable, may vary in different portions thereof, depending on the predominate stream. Ideally all of the streams are completely mixed throughout the entire drying or vaporization zone. However, in practice this will rarely be the case. Thus, the "temperature of the drying atmosphere" is actually the temperature within the system as described above.

Generally the temperature of the drying atmosphere will be in the range of 30° to 80° C. This range is a practical range based on preferred and normal solvents for the polymers, polymer softening temperatures and energy considerations, thus drying atmospheres outside of this temperature range may be used to carry out the invention as described. It should be appreciated that solvents having the requisite vapor pressure at higher temperatures than, heptane for example, may contain higher concentrations of polymer than heptane because higher atomization temperature of the solution is possible, hence the viscosity of the solution with the higher concentration of polymer is below the maximum found suitable.

The solvents employed are preferably paraffins or cycloparaffins having 6 to 12 carbon atoms, such as hexane cyclohexane, heptane, methylcyclohexane, octane, isooctane, or mixtures of solvents.

The solvent will generally contain at least 1 weight % of the polymer. The solubility of the polymer in the solvent will vary, however, usually elevated temperatures, e.g., around 90° C or more, are required to maintain the polymer in solution, thus this aspect of the operation of the process may place a practical limitation on the lower temperature and humidity of the drying atmosphere in the vicinity of the atomizer as noted above. The solvent may not perform satisfactorily below the solution temperature of the polymer prior to its exit from the spray nozzle, since there would be a tendency below the polymer solution temperature to precipitate polymer, which may cause formation of fine strings of precipitated polymer, plugging of the nozzle or otherwise fouling the system.

The solution of polymer in solvent will generally be pumped through the nozzle at pressures of 5 to 20 atmospheres at temperatures generally in the range 90° to 150° C.

It can be appreciated that the lower temperature of the drying atmosphere, substantially below temperature of the solution exiting the nozzle, is obtained by the vaporization process as the solvent is flashed off in the spray drying chamber as the powder is being precipitated and as it dries. Therefore, the drying gas must be warm enough to enhance drying but not too warm (which would stick the resin particles together or would induce too rapid solvent evolution). The ratio of drying gas when used, to atomized solvent will be maintained at a level to prevent equilibrium limitation on solvent vapor content from slowing the drying process. The temperature of the drying gas may be from about −10° to 120° C depending on the volatility of the solvents employed, although more practical ranges are about 0° to 40° C.

It is necessary to determine for each solvent, the particular conditions for the streams included in the drying atmosphere, in order to produce an atmosphere in which the solvent has a vapor pressure within the recited ranges. Other factors than the temperature affecting streams comprising the drying atmosphere would be rates of flow and the relative amounts of each stream in the drying atmosphere. These are easily adjusted by those of skill in the art with a minimal amount routine optimization. The vapor pressure of different solvents at various temperatures is readily available from standard reference tables such as found in the *Handbook of Chemistry and Physics*, The Chemical Rubber Co., 45 Edition, pages D-103 to D-118 and the like.

The present process may be suitably carried out in conventional spraying or atomizing equipment. An atomizer is designed to break up a liquid into droplets. Both conventional single and two-fluid nozzles have been employed in the present invention. These conventional nozzles are well known in the art, for example as described in *Atomization and Spray Drying*, W. R. Marshall, Jr. Chem. Eng. Prog. Monograph Series No. 2, Vol. 50, 1954, and *Perry's Chemical Engineering Handbook*, 3rd Ed. 1950, pp. 1170–1172.

A two-fluid nozzle employs a second fluid, generally a gas to aid in dispersing the liquid stream into droplets.

Air may be the atomizing gas, but generally steam or an inert gas such as nitrogen $CO_2$, helium, etc., is used to reduce the hazard of a dust or solvent explosion in the drying area. As noted above the atomizing gas is one of the components of the drying atmosphere and by adjustment within the usual range of about 90° to 150° C the temperature in the drying area may be affected. One consideration regarding the temperature of the atomizing gas, in that its temperature should not be so low as to chill the solvent and cause premature precipitation of the polymer, for example in the nozzle.

In this regard it is common to provide means to heat the nozzle, thereby reducing the tendency for polymer build up therein.

The process is achieved by pumping the polymer solution with or without an atomizing gas through a nozzle and discharging the stream into essentially atmospheric pressure.

The area beyond the nozzle may be considered the "drying atmosphere or zone", although the resulting powder may still be damp. In any event a predominate amount, e.g., 50 or more % of the solvent, generally up to 80% is vaporized and removed, from the drying zone. The damp powders produced may tend to agglomerate and conventional means of attrition may be required to produce the fine free flowing powders. This problem may be substantially eliminated by operating the process to remove the greatest amount of solvent, i.e., operation of the drying zone temperature under conditions which are not equilibrium limited and in the upper region of maximum vapor pressure for the solvent, without formation of fibers.

The drying zone, may be a chamber, or merely enclosed space, for the convenience of collecting the powder. The atmosphere in the drying zone is preferably, inert, such as nitrogen, $CO_2$ or helium. The drying atmosphere may be removed, along with vaporized solvent, separated therefrom, and recycled to the drying zone. Similarly the solvent may be recovered and recycled. Polymer fines which may be entrained in these gases are desirably removed by a cyclone or conventional device. The fines are particularly useful for electrostatic coating processes. Any unrecovered fines remaining in the solvent will be redissolved when the solvent recycles, and account should be made thereof in determining the polymer concentration in the solvent.

In general the polymers suitable for the practice of the present invention include any normally solid synthetic organic polymeric thermoplastic resin. Included are polyolefins, vinyls, olefin-vinyl copolymers, olefin-allyl copolymers, polyamides, acrylics, polystyrene, cellulosics, polyesters, and polyhalocarbons.

Generally the most suitable polyolefins for use in the present process include normally solid polymers of mono-alpha-olefins, which comprise from 2 to 6 carbon atoms, for example, polyethylene, polypropylene, polybutene, polyisobutylenes, poly (4-methylpentene-1), copolymers of these various alpha-olefins and the like.

Vinyl polymers suitable for use herein include polyvinyl chloride, polyvinyl acetate, vinyl chloride/vinyl acetate copolymers, polyvinyl alcohol and polyvinyl acetal.

Among the suitable olefin-vinyl copolymers are ethylene-vinyl acetate, ethylene-vinyl propionate, ethylene vinyl isobutyrate, ethylene vinyl alcohol, ethylene-methyl acrylate, and the like. Olefin-allyl copolymers include ethylene-allyl alcohol, ethylene-allyl acetate, ethylene-allyl acetone, ethylene-allyl benzene, ethylene-allyl ether, and the like.

Examples of some specific acrylic polymers are polymethyl methacrylate, polyacrylonitrile, polymethylacrylate and polyethylmethacrylate. The polyamides suitable for use include polyhexamethylene adipamide, polyhexamethylene sebacamide, and polycaprolactam.

The present process may also be used to produce powders from a solvent reaction system wherein the polymeric material is prepared in a solvent system, such as for example the alpha-olefin polymers, as described in numerous patents such as U.S. Pat. Nos. 2,112,300; 3,113,115: 3,197,452; Belgian Pat. No. 538,782 and British Pat. No. 994,416.

POLYMER CATALYSTS AND PROCESSES

The catalyst is normally prepared from a transition metal compound, preferably a halide, and a reducing component consisting normally of aluminum metal or a metal alkyl compound. Representative of the transition metal compounds used is a metal selected from Groups 4B, 5B, and 6B of the Periodic System.* Included in the preferred species are the titanium halides, for example, titanium tetrachloride, titanium trichloride, and titanium dichloride, and mixtures thereof. Other metal compounds such as zirconium tetrahalide and hafnium tetrachloride, vanadium chloride, chromium chloride, tungsten chloride, and the like, are especially useful. Still other transition metal halides containing halogens selected from the group consisting of bromine, iodine, chlorine, and in certain instances fluorine, can also be used.

* Handbook of Chemistry and Physics, The Chemical Rubber Co., Cleveland, Ohio, 45th Edition, 1964, p. B-2.

The reducing component of the catalyst composition may be any of a variety of reducing agents. Most common among the reducing agents are the organo-metallic compounds such as triethyl aluminum, aluminum diethyl chloride, aluminum ethyl dichloride, aluminum diethyl hydride, aluminum triisobutyl, aluminum triisopropyl, and related compounds. Many other reducing agents such as lithium aluminum hydride, zinc ethyl hydride, and the like are described in the literature as useful reducing agents and can also be used. These catalysts are all of the now well known "Ziegler" variety.

Certain Ziegler catalysts, or more particularly, certain modified Ziegler catalysts, have been found to be especially useful for polymerizing alpha-olefins. For example, a titanium trichloride catalyst modified with aluminum chloride having the formula, $TiCl_3.\frac{1}{3}AlCl_3$. Normally, this modified Ziegler catalyst is activated with a metal alkyl such as an aluminum alkyl, and preferably with an aluminum alkyl halide having the structural formula, $R_2AlX$ or $R_3Al_2X_3$, wherein R is selected from the group consisting of alkyl radicals containing 1 to 12 carbon atoms or phenyl or benzyl radicals, and X is a halogen atom selected from the group consisting of chlorine, bromine or iodine.

A variety of monomers may be polymerized with the Ziegler type catalysts. Any unsaturated hydrocarbon corresponding to the general formula $R-CH=CH_2$, wherein R is selected from the group consisting of an alkyl radical having from 1 to 6 carbon atoms, a phenyl radical, or an alkyl substituted phenyl radical can be used. Examples of specific unsaturated hydrocarbons which can be polymerized include alpha-olefins containing 3 to 8 carbon atoms, such as propylene, butene, isobutylene, pentene, isoamylene, hexene, isohexenes, heptene, isoheptenes, octene, isooctenes, and the like.

The preferred catalyst composition for the polymerization of propylene comprises a modified titanium trichloride having the structural formula, $TiCl_3.\frac{1}{3}AlCl_3$, activated with diethyl aluminum chloride. Ratios of diethyl aluminum chloride and titanium trichloride of between 0.3:1 and 6:1 may be advantageously used. The presence of an alkali metal halide in an amount of between 0.5 to 10 mols of an alkali metal halide per mol of reduced titanium tetrahalide, and preferably a mol ratio of from 0.8 to 5 mols of an alkali metal halide, such as sodium chloride, per mol of reduced titanium tetrahalide can be used for improving catalyst activity.

The monomers may be polymerized at moderate temperatures and pressures with the Ziegler type catalysts described above, generally at temperatures of 0° C to 150° C, with temperatures on the order of 25° C to 80° C being particularly useful. A solvent such as a paraffin or cycloparaffin having 3 to 12 carbon atoms, may be employed for the polymerizations, however, the olefin monomer is frequently used for this purpose. The polymerizations are preferably conducted under conditions that exclude atmospheric impurities such as moisture, oxygen and the like.

The pressure ranges from about atmospheric pressure to about several atmospheres with pressures in excess of about 500 p.s.i. rarely being employed.

After the polymer has been produced, the catalyst is deactivated by contacting the polymeric reaction mixture with a material which reacts with and deactivates the catalyst. Such materials include, for example, lower alcohols, acetone and water.

This solution may be used directly for the preparation of the high density powders, however, a preferred embodiment of the present invention is the preparation of high density powder from a prepared polymer, which has been washed with otherwise treated to remove extraneous material such as residual catalyst components. For example polypropylene which is substantially isotactic, i.e., highly crystalline stereoregular structure, having been prepared as described above and recovered as pellets may be dissolved in a suitable solvent and subjected to temperatures above 110° C up to about 130° C for a sufficient time to dissolve the polymer. Both the solvent boiling point and polymer solubility in the solvent are considered in determining the final temperature of the solvent. This determination may be easily made by those of skill in the art with a minimum of routine testing.

When reaction solutions are used directly for spraying according to the present solution it will generally be necessary to add solvent to reduce the concentration of polymer to no more than that which will allow formation of polymer droplets when the solution is atomized into the vaporization zone.

The solvents employed are preferably paraffins or cycloparaffins having 5 to 12 carbon atoms. Suitable solvents include n-pentane, isopentane, isooctane, cyclohexane, methylcyclohexane, n-heptane, nonane, and the like or mixtures of solvents. The reactor solvent may generally contain from about 1 to 25 weight percent, more preferably about 5 to 15 weight percent of polymer based on the total weight of the solution prior to being reduced with additional solvent for spraying.

Generally the polymers employed in the present invention will have average molecular weights in the range of 25,000 to 400,000.

The term polyolefins includes those materials modified with materials such as the unsaturated organic acids, for example, maleic acid, muconic acid, dimethyl muconic acid, acrylic acid, methacrylic acid, vinyl acetic acid, and the like. Generally the polyolefins may be modified by from 1 to 10 weight percent of the unsaturated acid. The modification has been observed to improve the surface adhering characteristics of the polyolefin polymers when they are employed as surface coating, particularly the alpha-olefins, such as polypropylene. The modifying unsaturated acids may be incorporated into the polyolefins by intimately contacting the modifier with the polyolefin in a melt or solution of the polymer in the presence of a free radical source, such as an organic peroxide or by copolymerization with another monomer followed by neutralization or partial neutralization to yield an ionomer if desired.

In the process of the present invention it is possible to employ graft polymers prepared by known methods in the art, e.g., those to be found in U.S. Pat. Nos. 3,177,269; 3,177,270; 3,270,090; 3,830,888; 3,862,265; British Pat. No. 1,217,231; British Pat. No. 679,562 and the like.

The preferred modifying monomers which are grafted to the backbone are $C_3$ to $C_{10}$, preferably $C_3$ to $C_6$ unsaturated mono- and polycarboxylic-containing unsaturated acids with preferably at least one olefinic unsaturation, anhydrides, salts, esters, ethers, amides, nitriles, thio, glycidyl, cyano, hydroxy, glycol, and other substituted derivatives thereof.

Examples of such acids, anhydrides and derivatives thereof include maleic acid, fumaric acid, itaconic acid, citraconic acid, acrylic acid, glycidyl acrylate, cyanoethylacrylate, hydroxyethylmethacrylate, acrylic polyethers, acrylic anhydride, methacrylic acid, crotonic acid, isocrotonic acid, mesaconic acid, angelic acid, maleic anhydride, itaconic anhydride, citraconic anhydride, sodium acrylate, calcium acrylate, magnesium acrylate and the like.

Other monomers which can be used either by themselves or in combination with one or more of the carboxylic acids or derivatives thereof include $C_8$ to $C_{50}$ vinyl monomers such as monovinyl aromatic compounds, i.e. styrene, chlorostyrenes, bromostyrenes, alpha-methyl styrene and the like.

Other monomers which can be used are $C_8$ to $C_{50}$ vinyl esters and allyl esters, such as vinyl butyrate, vinyl laurate, vinyl stearate, vinyl adipate and the like, monomers having two or more vinyl groups, such as divinyl benzene, ethylene dimethacrylate, triallyl phosphite, dialkylcyanurate and triallyl cyanurate.

The process of the present invention is especially useful for grafted polymers prepared by grafting a polymer of a $C_2$ to $C_8$ mono-$\alpha$-olefin or its copolymers with acrylic acid in a special process. The polymers of $C_2$ to $C_8$ mono-$\alpha$-olefins are commonly referred to as polyolefins and for the purpose of this invention are to include copolymers of the $C_2$ to $C_8$ mono-alpha-olefins with each other and with other monomers as well as the homopolymers.

Polymers containing diolefins such as butadiene and isoprene are also suitable. The polyolefins are produced utilizing in most instances a Ziegler-type catalyst, but can also be Phillips catalysts and high pressure technology.

Examples of suitable polyolefins, both plastic and elastomeric, include low or high density polyethylene, polypropylene, polybutene-1, poly-3-methylbutene-1, poly-4-methylpentene-1, copolymers of monoolefins with other olefins (mono-or diolefins) or vinyl monomers such as ethylene-propylene copolymers or with one or more additional monomers, i.e. EPDM, ethylene/butylene copolymer, ethylene/vinyl acetate copolymer, ethylene/ethyl acrylate copolymer, propylene/4-methylpentene-1 copolymer and the like.

The term "copolymer" includes two or more monomer constituents and substituted derivatives thereof.

The preferred polyolefins employed in the present invention contain propylene and/or ethylene, i.e. polypropylene and polyethylene. The starting polymer used as a base material in the graft process will preferably have a melt index (MI) ASTM D-1238-65T) of 1 to 40, preferably 5 to 40, and most preferably 5 to 10, or melt flow rate (MFR) between about 0.1 to 50 and preferably 0.5 to 10, most preferably 2 to 5. These melt flow rates correspond approximately to viscosity average molecular weights of about 100,000 to 500,000.

The preferred monomers to be grafted to the $C_2$ to $C_8$ polyolefin and other polymers for use in the present invention are maleic anhydride, acrylic acid, methacrylic acid, glycidyl acrylate, hydroxyethylmethacrylate and their derivatives. Others that can be used are described elsewhere herein. However, other monomers may be added in admixture with these such as maleic anhydride (MA), styrene, acid esters, salts and the like to form graft copolymers. MA and styrene and MA and acrylic acid are preferred over MA alone when polymer grafts of MA are desired.

The grafting reaction is initiated by a free-radical initiator which is preferably an organic peroxygen compound. Especially preferred peroxides are t-butylperbenzoate, dicumyl peroxide, 2,5-dimethyl-2,5-di-tert-butylperoxy-3-hexyne (Lupersol 130), alpha, alpha'-bis(tert-butylperoxy) diisopropyl benzene (VulCup R or Percadox 14), or any free radical initiator having a 10-hour half-life temperature over 80° C. or mixtures thereof. Generally, the higher the decomposition temperature of the peroxygen compound, the better. See pp 66–67 of *Modern Plastics*, November 1971, which is incorporated hereby by reference, for a more complete list of such compounds.

The free radical initiator is used in amounts corresponding to 0.005 to 5, preferably 0.02 to 2, most preferably 0.02 to 1.0 weight percent based on monomer. When based on polymer, free radical initiator is used in amounts of 0.0001 to 1, preferably 0.001, and most preferably 0.001 to 0.5 weight percent.

The monomer to be graft polymerized is used in amounts of 0.01 to 100, preferably 0.05 to 50, and most preferably 0.1 to 25 weight percent of the base polymer.

Generally, the monomer and initiator are blended together and added simultaneously, except in the situation of a polyethylene or ethylene predominant copolymer. Illustrative of the graft preparation is the grafting of acrylic acid onto polypropylene. Molten polypropylene is contacted with acrylic acid at 350° to 650° F, preferably 400° to 550° F in the presence of a peroxide initiator. The initiator and acrylic acid are added as a liquid blend. The resulting graft copolymers have been appreciably degraded and changed in molecular weight as compared to the base polymer.

EXAMPLES

Both single fluid and two-fluid nozzles were employed in tests conducted. Conditions and results are shown in the TABLE. The polymer, a solid polypropylene, melt which had been modified with 6% acrylic acid prepared as described above and having a melt flow rate of 50 was dissolved in the amounts shown in the specified solvent in a heated autoclave. The polymer solutions were made up in the autoclave by charging pellets and solvent, and heating the stirred mixture. Examples 4, 5, 8, 12 produced powders according to the present invention. Examples 11 and 12 were carried out in a closed cycle atomization unit, in which the drying zone was an enclosed chamber. Examples 1–10 were sprayed into normal room atmosphere at about 10° C and collected on a pan held several meters from the nozzle.

The 3 weight % upper limit of polymer concentration with the specific solvent is considered critical, since higher concentration of polymer result in fibers. The details of the tests are set out in the TABLE.

TABLE

| Ex. | Nozzle | % Polymer By Weight | Solvent | Temp. of solution to Nozzle °C | Time at Temp. Before Atomization, Hours | Comments |
|---|---|---|---|---|---|---|
| 1 | 28-mil single fluid nozzle | 5 | Hexane | 130 | 2 | Coarse fibers with large heads. Pressure ~6 atm of solution. Atomizing $N_2$ cold. Nozzle heated to 105°C. |
| 2 | " | 5 | Hexane | 130 | 2 | Coarse fibers with large heads. Pressure ~6 atm (of solution) plus 5 atm $N_2$ cold. Nozzle heated to 105°C. |
| 3 | 20-mil two-fluid nozzle (20-mil nitrogen annulus) | 5 | Heptane | 130 | 2 | Fine fibers with few heads. Heated lines to nozzle to 135°C. Pressure ~2 atm (of solution) plus 9 atm. $N_2$. Product damp. Atomizing $N_2$ cold. Nozzle heated to 105°C. |
| 4 | " | 2.5 | Heptane | 130 | 2 | Atomization improved as pressure on solution raised from 2 to 11 atm by addition of nitrogen. Atomization $N_2$ heated to 95°C. Product damp. Nozzle heated to 105°C. |
| 5 | " | 2.5 | Heptane | 130 | 1 | Spherical fine powder (-100μu). Rerun No. 4 with 11 atm pressure and better insulation of ducts. Product damp. |
| 6 | " | 2.5 | Hexane | 130 | 2 | Fine fibers. Rerun of No. 5 except for solvent. |
| 7 | " | 5.0 | Heptane | 130 | 2 | Fibers. Try to increase PP content, but unable. Product dry. |
| 8 | " | 2.5 | Heptane | 130 | 1 | Spherical fine powder (-100mu) with some aggregates. Rerun of No. 5 but nozzle now heated to 200°C. |
| 9 | " | 5 | Heptane | 180 | 1 | Fibers. Higher temperature spraying of more concentrated solution. Product very dry at this spraying temperature and no atomization. 15 atm atomizing pressure. |
| 10 | " | 5 | Heptane | 100 | 2 | Fibers. Cool remaining No. 9 solution to see effect on spraying. Probably not precipitated. 13 atm atomizing pressure. |
| b) Closed Cycle Pilot Unit | | | | | | |
| 11 | 20-mil two-fluid nozzle (20-mil nitrogen annulus) | 2.5 | Heptane | 130 | 2 | Drying gas inlet temperature varied from 110°C to 80°C. Only fibers formed. Feed rate 40 kg/hr. Test duration 40 minutes |
| 12 | 28-mil single-fluid nozzle | 2.5 | Heptane | 130 | 2 | Drying gas inlet temperature varied from 80°C to 35°C. Powder formed when inlet temperature less than 40°C. Buildup of wet polymer on chamber at lower temperatures. Feed rate 40 kg/hr. Test duration 50 minutes. |

The invention claimed is:

1. A process for producing high density fine polymer powder comprising
    heating a solution of a solvent and a polymer and,
    atomizing said solution into a drying atmosphere,
    wherein the improvement comprises having an amount of polymer in solution in said solvent, the viscosity of the solution of solvent and polymer being no greater than 5 centipoise at the temperature of atomization, whereby the formation of droplets of polymer is not inhibited at the temperature of said drying atmosphere,
    said solvent having a vapor pressure in the range of about 50 to 400 mm of Hg at the temperature of the drying atmosphere.

2. The process according to claim 1 wherein said solvent has a vapor pressure of about 100 to 300 mm of Hg.

3. The process according to claim 1 wherein said solution is pressured through a nozzle at 5 to 20 atmospheres.

4. The process according to claim 3 wherein solution is mixed with a blowing gas for atomizing.

5. The process according to claim 1 wherein said solvent is a $C_6$ to $C_{12}$ hydrocarbon.

6. The process according to claim 5 wherein said polymer is a $C_2$ to $C_6$ polyolefin.

7. The process according to claim 6 wherein said polymer is polyethylene.

8. The process according to claim 6 wherein said polyolefin is polypropylene.

9. The process according to claim 1 wherein said polymer is a $C_2$ to $C_6$ polyolefin having ethylenically unsaturated organic acid grafted thereon.

10. The process according to claim 9 wherein said polyolefin is polypropylene having 0.1 to 25 weight percent of said acid grafted thereon.

11. The process according to claim 10 wherein said acid is acrylic acid.

12. The process according to claim 11 wherein said solvent is heptane and the upper polymer concentration is 3 weight percent.

13. The process according to claim 1 wherein the temperature of the drying atmosphere is in the range of 30° to 80° C.

14. The process according to claim 1 wherein said polymer is ethylene vinyl acetate having ethylenically unsaturated organic acid grafted thereon.

15. The process according to claim 14 wherein said acid is acrylic acid.

16. The process according to claim 1 wherein said polymer is a $C_2$ to $C_6$ polyolefin grafted with glycidy acrylate.

* * * * *